(No Model.)  3 Sheets—Sheet 1.

D. A. BABÉ.
BICYCLE.

No. 401,105. Patented Apr. 9, 1889.

Witnesses.
John Bickel
Arthur H. Gamblin

Inventor:
Desiré Alexandre Babé
By his attorneys
Brown & Griswold (No Model.)   3 Sheets—Sheet 3.

D. A. BABÉ.
BICYCLE.

No. 401,105.   Patented Apr. 9, 1889.

Witnesses.
John Bicket
Arthur H. Gamblin.

Inventor:
Desiré Alexandre Babé
By his attorneys
Brown & Griswold

UNITED STATES PATENT OFFICE.

DÉSIRÉ ALEXANDRE BABÉ, OF PARIS, FRANCE.

BICYCLE.

SPECIFICATION forming part of Letters Patent No. 401,105, dated April 9, 1889.

Application filed December 18, 1888. Serial No. 294,008. (No model.)

*To all whom it may concern:*

Be it known that I, DÉSIRÉ ALEXANDRE BABÉ, a citizen of the Republic of France, residing at Paris, in the said Republic, have invented a new and useful Improvement in Bicycles, of which the following is a specification, reference being had to the accompanying drawings.

One of the distinctive essential characteristics of a bicycle constructed according to my invention is that there is nothing between the two wheels above the level of the pedals which compels the rider to straddle, and that therefore the bicycle may be used not only by men but by ladies. This construction has also the advantage that in case of falling the two feet of the rider may come to the ground on the same side of the pedals, which renders the position of the fall less painful and less dangerous.

Another feature of my invention is the combination, with a bicycle-frame, of two articulated and spring-sustained legs or props, which serve to maintain the bicycle in an upright position when at rest, and therefore permit the rider to mount the bicycle without being obliged to first set it in motion.

My invention also embodies other features, which will be hereinafter described and claimed.

Figure 1:
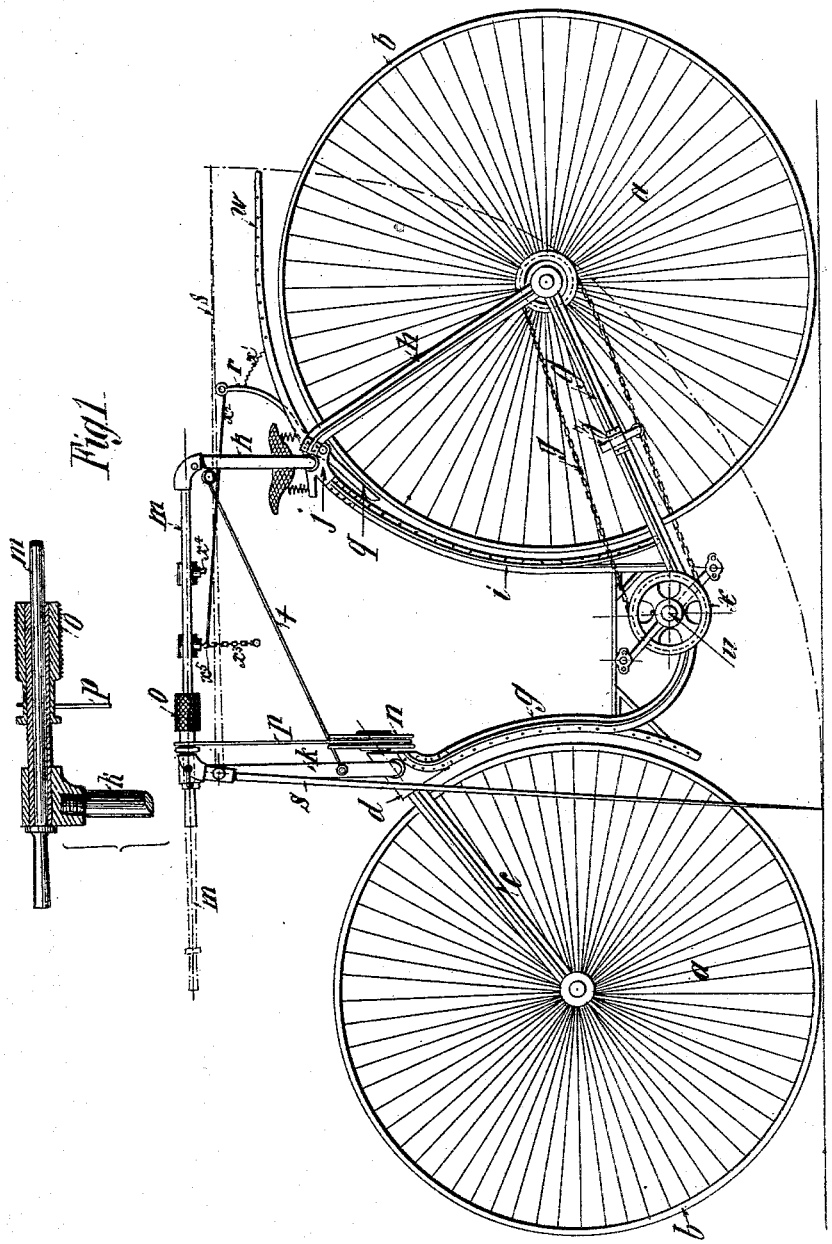
Figure 2:
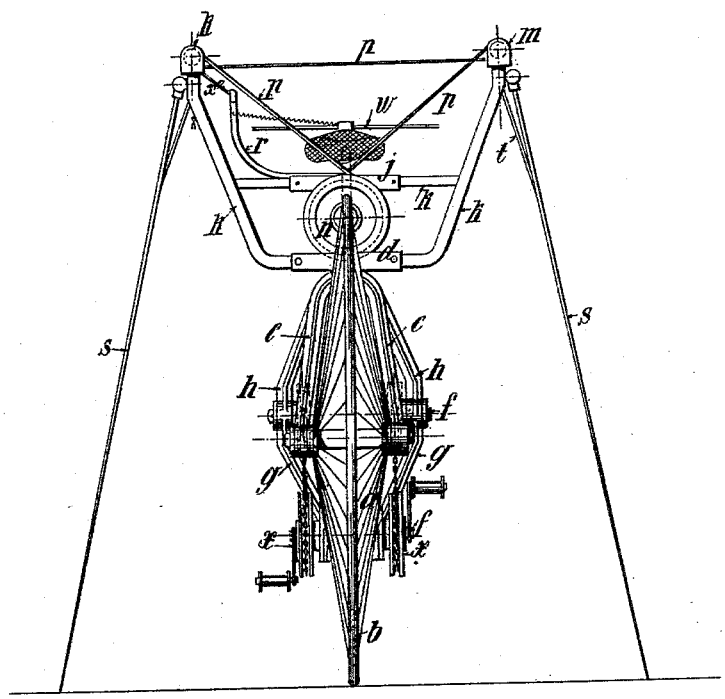
Figure 3:
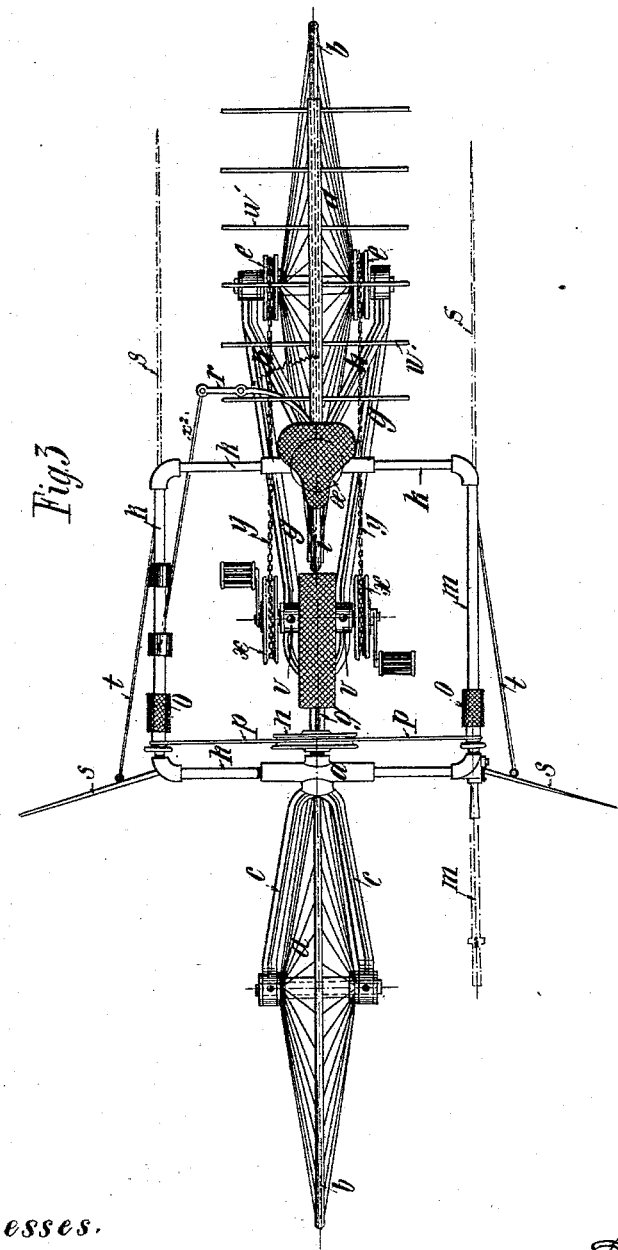

In the accompanying drawings, Figure 1 shows a side view of a bicycle constructed according to my invention. Fig. 2 is a rear view of the same. Fig. 3 is a plan.

Similar letters of reference designate corresponding parts in the several figures.

$a$ designates the two wheels, which may be of uniform or different size. The fork C, which embraces the front wheel, is terminated by a rod which passes through a piece, $d$, constituting a sort of cross-head with five branches. This rod carries a pulley, $m$, which is connected with it in such manner, by means of a ball-and-socket joint, as to permit the said pulley to remain always vertical; and notwithstanding the slant of the fork and its rod the said pulley serves to control the direction of the vehicle, as will be hereinafter described. In the lateral arms of the cross-head $d$ are secured bars $k\ k$, which extend upward obliquely, as shown in Fig. 2, for some distance, and thence extend horizontally backward to a point whence they are extended obliquely downward for the support of the saddle $k'$, and thus constituting an upper quadrangular frame. The left side of this frame may form a slide, $n$, to permit a person to enter within the frame without lowering it. Collars $o$, capable of turning freely about the bars $k$, are secured by cords $p$ to the steering-wheel $n$, for the purpose of controlling its direction. On each side of the hind wheel are secured pulleys $e$, which may be either firmly secured to the said wheel itself or keyed upon its axle $f$.

$g$ designates the lower frame of the bicycle. It is formed of a bar secured in the lower socket of the cross-head $d$, and follows the contour of the front wheel downward to a point where it is curved backward to receive and support a box, $d$, which receives the shaft of the pedals and of the pulleys $x$. Thence it is divided in the form of a fork and extended backward to embrace the hind wheel and to connect with the axle $f$ of the latter. The two branches of this fork are prolonged upward and forward from the axle $f$ and connected with the frame $k$ under the saddle $k'$. Driving-chains $y$ run from the pulleys $x$ on the pedal-shaft to the pulleys $e$ on the shaft of the axle of the hind wheel. Tightening-pulleys carried by sliding bars $z$, (see Fig. 1,) adjustable on the branches of the fork $g$, provide for the tightening of those chains. A curved bar, $i$, gives rigidity to the connection between the front train and the rear train. This bar follows the contour of the hind wheel and connects the upper part of the fork $h$ and the upper part of the base of the fork $g$. A cross-piece, $j$, constitutes a connection between the pieces $h$ and $i$. From this cross-piece $j$ there extends rearwardly over the hind wheel a tail-bar, $w$, on which are laterally-projecting pegs $w'$, upon which baggage may be carried upon each side of the hind wheel.

$q$ is a brake supported by the cross-piece $j$.

$r$ is a brake-rod, which is drawn backward by the india-rubber spring $x'$, and which may be drawn forward by the rod $x^2$, which is provided with rings $x^3$, to attach it to hooks $x^4$ upon the main frame on the left-hand side.

To maintain the bicycle in its upright position while at rest, two light legs, s, are articulated upon the sides of the frame k, serving as supporting-braces when their lower ends rest upon the ground. India-rubber springs t serve to raise these to a horizontal position, as shown in dotted lines in Figs. 1 and 2, when the machine is running.

A plate, a', covers the cross-piece j, which connects the pieces h and i.

The pieces g and i may be furnished with dirt-guards of leather, metal, or other suitable material, to inclose the sides of the wheel and protect the rider. Instead of the double driving-gear for the driving-wheel a, by means of two pulleys, e, and driving-chains y, a gear on one side of the wheel only can be used.

What I claim as my invention, and desire to secure by Letters Patent, is—

1. The combination, in a bicycle, of an upper frame, k, having on one side a slide, m, to provide for opening it, a cross-head, d, and a lower frame, g h i, connected in front with the cross-head d, and connected with the upper frame, m, at the rear thereof, substantially as and for the purpose herein set forth.

2. The combination, with a frame, k, and the cross-head d, of the fork c, provided with a rod or pivot passing through it, the pulley n on the upper end of the said rod or pivot, the collars o on the sides of the frame k, and the cords p, connecting said collars with the said pulley, all substantially as herein set forth.

3. The combination, with an upper frame, k, of the tail-bar w, arranged over the hind wheel and provided with pegs w', for hanging of baggage, substantially as herein specified.

4. The combination, with the frame m, of the supporting-legs s, pivoted to said frame near the front thereof, and a spring, t, adapted to spring said legs out into a horizontal position at the sides of the frame, substantially as specified.

In testimony whereof I have signed this specification in the presence of two subscribing witnesses.

DÉSIRÉ ALEXANDRE BABÉ.

Witnesses:
PAUL GIRAL,
R. J. PRESTON.